US012601118B2

(12) United States Patent
Cagnone et al.

(10) Patent No.: US 12,601,118 B2
(45) **Date of Patent: *Apr. 14, 2026**

(54) EMBOSSED TISSUE

(71) Applicant: Kimberly-Clark Worldwide, Inc., Neenah, WI (US)

(72) Inventors: Massimo Cagnone, Prato Sesia (IT); Gabriel F. Botero Ospina, London (GB); Claudia Gelmini, Verona (IT)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 247 days.

This patent is subject to a terminal disclaimer.

(21) Appl. No.: 18/266,613

(22) PCT Filed: Dec. 11, 2020

(86) PCT No.: PCT/US2020/064451

§ 371 (c)(1),
(2) Date: Jun. 12, 2023

(87) PCT Pub. No.: WO2022/125108

PCT Pub. Date: Jun. 16, 2022

(65) Prior Publication Data

US 2024/0044085 A1 Feb. 8, 2024

(51) Int. Cl.

| | |
|---|---|
| ***D21H 27/02*** | (2006.01) |
| ***B31F 1/07*** | (2006.01) |
| ***D21H 27/40*** | (2006.01) |

(52) U.S. Cl.

CPC ............... *D21H 27/02* (2013.01); *B31F 1/07* (2013.01); *D21H 27/40* (2013.01); *B31F 2201/0735* (2013.01); *B31F 2201/0738* (2013.01); *B31F 2201/0766* (2013.01)

(58) Field of Classification Search

CPC ...................................................... D21H 27/02
USPC .......................................................... 162/113
See application file for complete search history.

(56) References Cited

U.S. PATENT DOCUMENTS

| | | | |
|---|---|---|---|
| 6,572,722 | B1 | 6/2003 | Pratt |
| 2003/0026953 | A1 | 2/2003 | Muller |
| 2009/0202774 | A1 | 8/2009 | Mansson et al. |
| 2009/0226670 | A1 | 9/2009 | Schutz |

(Continued)

FOREIGN PATENT DOCUMENTS

| | | | |
|---|---|---|---|
| EP | 1533112 | A1 | 5/2005 |
| WO | 2020180314 | A1 | 9/2020 |

*Primary Examiner* — Jacob T Minskey
(74) *Attorney, Agent, or Firm* — KIMBERLY-CLARK WORLDWIDE, INC.

(57) ABSTRACT

The disclosed tissue products have an embossing pattern that is aesthetically pleasing and provides improved product properties, such as good bulk, while reducing processing issues, such as wrinkling. The embossing patterns generally comprise a background and a foreground pattern where the background pattern is the dominate pattern and provides the product with a uniform appearance that connotes femininity, softness and cleansing. The background pattern is preferably formed entirely from open design elements such as first, second and third open, curvilinear line elements, wherein the second and third line elements are discrete, similarly shaped curvilinear line elements that are arranged parallel to one another and spaced apart about 1.0 mm or less.

14 Claims, 7 Drawing Sheets

(56) References Cited

U.S. PATENT DOCUMENTS

| | | | | |
|---|---|---|---|---|
| 2018/0142422 | A1* | 5/2018 | Baum .................... | D21H 27/02 |
| 2019/0352853 | A1 | 11/2019 | Baum et al. | |

* cited by examiner

EMBOSSED TISSUE

BACKGROUND

It is well known in the art to emboss bond multiple plies of lightweight cellulosic material to form tissue products such as bath tissues, facial tissues, paper towels, industrial wipers, foodservice wipers, napkins, medical pads, and other similar products. The embossed tissue products may comprise one, two, three or more plies. Embossing not only plies multiple webs together but may also impart the tissue product with an aesthetically pleasing pattern. Examples of apparatus and methods for embossing multi-ply paper products are disclosed, for example, in U.S. Pat. Nos. 6,733,866, 7,871,692 and 8,287,986 and U.S. Publication No. 2012/0156447.

Embossing may also be used to alter or improve certain tissue product properties such as sheet bulk and perceived softness. For example, tissue products manufactured using conventional creped wet press technology can be embossed subsequent to creping to improve bulk and perceived softness. Embossing often increases the surface area of the sheets by introducing a plurality of protuberances and thereby enhances the bulk and handfeel of the product. Examples of apparatus and methods for embossing multi-ply paper products to improve handfeel and bulk are disclosed, for example, in U.S. Publication Nos. 2005/0103456, 2018/0142422 and 2018/0135254.

Often tissue products marketed in rolls, contain a specified number of sheets per roll. Tissue embossed in conventional patterns of dot embossments, when packaged in roll form, exhibit a tendency to be non-uniform in appearance often due to compressing of the embossments as the sheet is wound onto the roll, detracting from the appearance of the rolls.

SUMMARY

The present inventors have now discovered novel embossed multi-ply tissue products having improved bulk, softness, strength, embossment clarity and/or embossment height compared to prior art embossed tissue products. In certain embodiments the multi-ply tissue products of the present invention may comprise a first tissue ply having an embossing pattern disposed thereon. The embossing pattern generally comprises at least a first motif consisting of a plurality of line embossments. The line embossments are arranged so as not only to form an aesthetically pleasing appearance, but also to provide improved product properties, such as good bulk, while reducing processing issues, such as wrinkling.

Accordingly, in certain embodiments the present invention provides tissue products having an embossing pattern disposed on at least one outer surface thereof. The embossing pattern generally comprises a repeating first motif. The first motif may comprise a plurality of curvilinear and discrete line elements that are arranged relative to one another to provide an aesthetically pleasing appearance and improve the processing of the product.

In certain preferred embodiments all of the embossed elements forming the first motif are line elements and more preferably curvilinear line elements and still more preferably discrete curvilinear line elements. For example, in certain instances the first motif may comprise a first curvilinear and discrete line embossment, a second curvilinear and discrete line embossment and a third curvilinear and discrete line embossment. The first line element may be formed from a single, solid, line embossment and second and third line elements may be formed from a plurality of dot embossments arranged to give the appearance of a line element.

In those embodiments where the first motif comprises a plurality of discrete line elements, such as discrete first, second and third line embossments, it may be preferable that the elements are arranged such that the they do not intersect one another. Additionally, it may be preferable that at least two of the elements, such as the second and third line embossments, be arranged pair-wise such as line embossments arranged parallel to one another and spaced apart from one another from about 0.75 to about 1.0 mm.

In other embodiments the present invention provides a multi-ply embossed tissue product wherein the first ply comprises a first embossing pattern according to the present invention and the second ply comprises a plurality of micro-embossments, and more preferably a plurality of micro-dot embossments. In certain instances, the embossments on the second ply may be disposed in a second pattern.

In a particularly preferred embodiment, the present invention provides an embossed multi-ply product comprising a first embossed ply having a plurality of embossments disposed thereon. The first ply embossments are preferably arranged in a pattern comprising a first motif consisting of first, second and third curvilinear and discrete line embossments. The second and third curvilinear and discrete line embossments are preferably in the form of individual dot embossments arranged to form a discrete line element where the second and third line elements are arranged in a pair-wise fashion. The pair-wise elements are preferably parallel to one another and spaced apart from one another from about 0.75 to about 1.0 mm. The dot embossments may have a depth (measured as described in the Test Methods section below) of about 300 μm or more, such as from about 300 to about 500 μm. The combination of these elements provides an aesthetically pleasing and well-defined embossment, while improving important tissue product properties such as sheet and roll bulk and softness, particularly when combined with a second ply comprising micro-embossments.

DEFINITIONS

Figure 1:
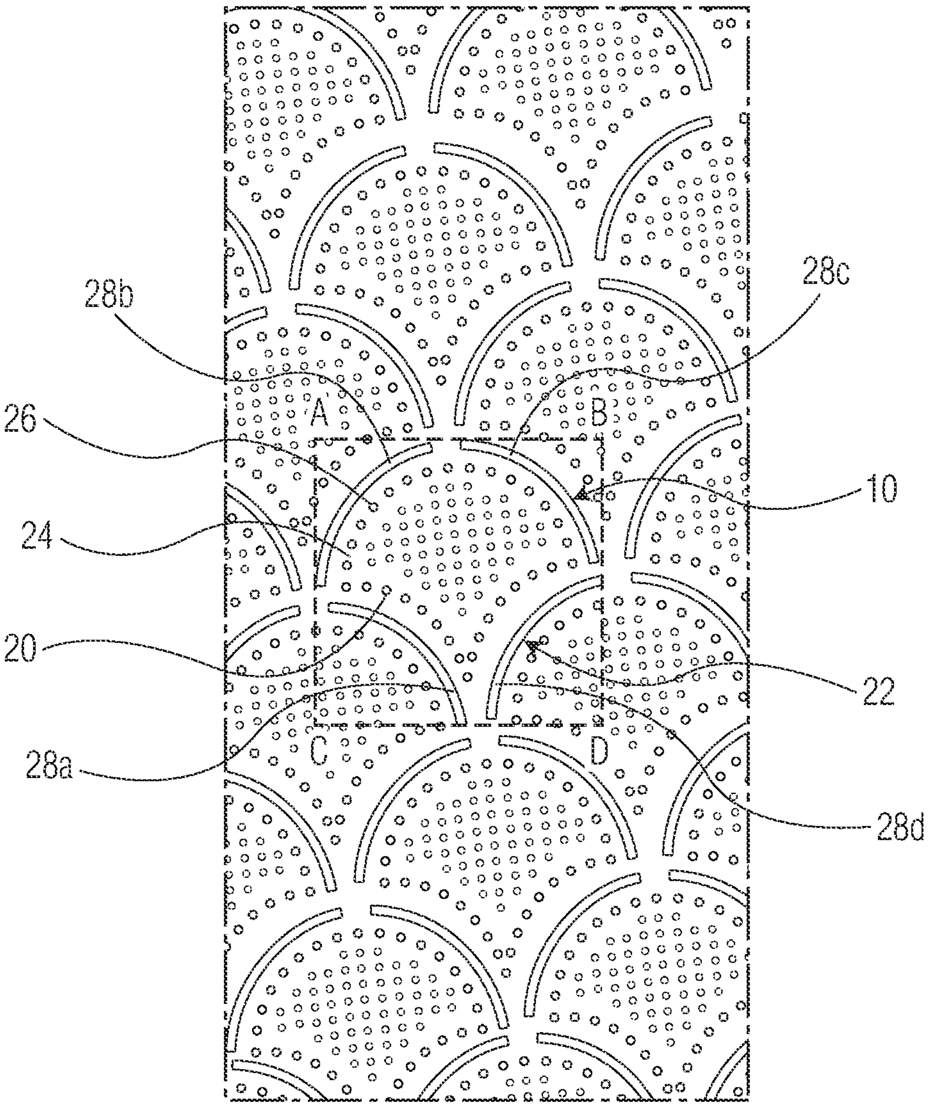
FIG. 1 PRIOR ART
FIG. 1 illustrates a prior art embossing pattern.

As used herein the term “machine direction” or “MD” generally refers to the direction in which a tissue web or product is produced. The term “cross-machine direction” or “CD” refers to the direction perpendicular to the machine direction.

As used herein the term “basesheet” refers to a tissue web formed by any one of the papermaking processes described herein that has not been subjected to further processing, such as embossing, calendering, treatment with a binder or softening composition, perforating, plying, folding, or rolling into individual rolled products.

As used herein the terms "tissue product," "paper web," "web," "sheet," and "fibrous structure," are all used interchangeably to refer to sheets of fibrous material suitable for consumer use such as paper toweling, bath tissue, and facial tissue. Sheet products of the present invention may be useful as a wiping implement for post-urinary and post-bowel movement cleaning (toilet tissue), for otorhinolaryngological discharges (facial tissue), and multi-functional absorbent and cleaning uses (absorbent towels). Products of the present invention can be flushable, i.e., such as bath tissue. In a preferred embodiment, the sheet products may be convolutely wound about a core or without a core to form a rolled product. These rolled products may comprise a plurality of connected and perforated sheets that may be separated from adjacent sheets and dispensed.

As used herein the term "ply" refers to a discrete tissue web used to form a tissue product. Individual plies may be arranged in juxtaposition to each other. In a preferred embodiment, tissue products prepared according to the present invention comprise two or more plies arranged in facing relation to one another.

As used herein, the term "layer" refers to a plurality of strata of fibers, chemical treatments, or the like, within a ply. A "layered tissue web" generally refers to a tissue web formed from two or more layers of aqueous papermaking furnish. In certain instances, the aqueous papermaking furnish forming two or more of the layers comprises different fiber types.

As used herein the term "basis weight" generally refers to the conditioned weight per unit area of a tissue and is generally expressed as grams per square meter (gsm). Basis weight is measured as described in the Test Methods section below. While the basis weights of tissue products prepared according to the present invention may vary, in certain embodiments the products have a total basis weight of about 30 gsm or greater, such as about 34 gsm or greater, such as about 36 gsm or greater, such as from about 30 to about 65 gsm, such as from about 32 to about 60 gsm, such as from about 38 to about 48 gsm.

As used herein, the term "caliper" refers to the thickness of a tissue product, web, sheet or ply, typically having units of microns (μm) and is measured as described in the Test Methods section below.

As used herein, the term "sheet bulk" refers to the quotient of the caliper (μm) divided by the basis weight (gsm) and having units of cubic centimeters per gram (cc/g). Tissue products prepared according to the present invention may, in certain embodiments, have a sheet bulk of about 6.0 cc/g or greater, such as about 8.0 cc/g or greater, such as about 10.0 cc/g or greater, such as from about 6.0 to about 14.0 cc/g.

As used herein, the term "geometric mean tensile" (GMT) refers to the square root of the product of the machine direction tensile strength and the cross-machine direction tensile strength of the web. The GMT of tissue products prepared according to the present invention may vary, however, in certain instances the GMT may be about 800 g/3" or greater, such as about 900 g/3" or greater, such as about 1,000 g/3" or greater, such as from about 800 to about 1,700 g/3".

As used herein "substantially oriented" when used in reference to an embossed element, a motif or a pattern generally means that the element has a principle orientation that is within at least 10 degrees of the MD or CD axes and more preferably within at least 5 degrees of the MD or CD axes.

As used herein the term "line element" refers to an element in the shape of a line, which may be continuous, discrete, interrupted, or a partial line with respect to a tissue product on which it is present. The line element may be of any suitable shape such as straight, curled, curvilinear, and mixtures thereof. In one example, the line element may comprise a plurality of discrete elements, such as dots, dashes or broken lines for example, that are disposed relative to one another to form an element in the shape of a line having a substantially connected visual appearance.

As used herein the term "continuous," when referring to an element disposed on the surface of a tissue product, such as a design element, a motif or a pattern, means that the element extends throughout one dimension of the tissue product surface and does not have a beginning or an end within the tissue product surface plane.

Figure 2:
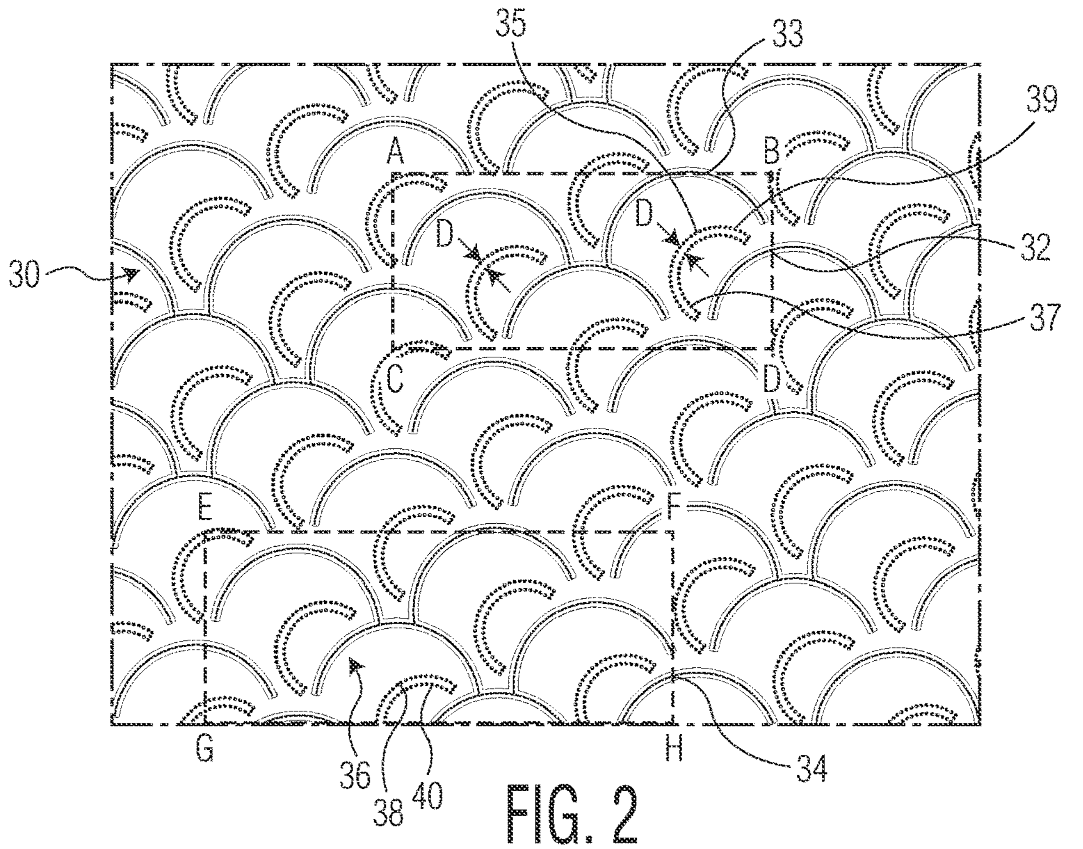
FIG. 2 illustrates an embossing pattern according to one embodiment of the present invention

As used herein the term "semi-continuous," when referring to an element disposed on the surface of a tissue product, such as a design element, a motif or a pattern, means that the element has at least a first end within the tissue product surface but the element extends beyond an edge of the tissue product surface plane such that it has the visual appearance of extending beyond the tissue product surface plane. An example of a semi-continuous line element 36 is illustrated in FIG. 2. The first line element 36 has a plurality of ends within the tissue surface plane but extends beyond an edge of the tissue product surface plane such that it has the visual appearance of extending beyond the tissue product surface plane.

As used herein the term "discrete," when referring to an element disposed on the surface of a tissue product, such as a line element, a design element or a pattern, means that the element is visually unconnected from other elements and does not extend continuously in any dimension of the tissue product surface. An example of a discrete line element is illustrated in FIG. 2. In the illustrated embodiment second and third line elements 35, 37 are substantially similarly shaped and equally spaced apart from one another along the entire length of the element. Each element discrete element has a first and second end within the tissue product surface plane such that the elements are visually unconnected from other elements, such as from the first line element.

As used herein the term "design element" generally refers to a shape or combination of shapes that visually create a distinct component. A design element is a curvilinear design element where it is at least partially formed by a curvilinear line element. A design element may be continuous, semi-continuous or discrete. It is not necessary that a design element form a recognizable shape. The design element may be textured having a z-directional elevation relative to the plane of the tissue product, such as protrusions or depressions formed either by wet molding or embossing the tissue product. In other embodiments the design element may not be textured and be formed by printing on the tissue product surface.

As used herein the term "closed," when referring to a design element, generally means that the design element has no beginning or end. In certain instances, an element may be closed despite having breaks or gaps provided that the overall visual appearance is that the element has no beginning and no end.

As used herein the term "open," when referring to a design element, generally means that design element has a beginning and/or an end. A design element may be open even though it begins or ends at the edge of a given sheet. In certain instances, a design may be open even though it begins at one edge of a sheet and continues across the sheet to another edge.

As used herein the term "pattern" generally refers to the arrangement of one or more design elements. Within a given pattern the design elements may be the same or may be different, further the design elements may be the same relative size or may be different sizes.

As used herein the term "motif" generally refers to the recurrence of one or more design elements within a pattern. The recurrence of the design element may not necessarily occur within a given sheet, for example, in certain embodiments the design element may be a continuous design element extending across two adjacent sheets separated from one another by a line of perforations. Motifs are generally non-random repeating units that form a pattern.

As used herein the term "micro-embossments" generally refers to a plurality of discrete embossments disposed on a tissue ply where the number of embossments per square centimeter of tissue surface area (embossment density) is at least 25 embossments/cm$^2$, such as at least about 30 embossments/cm$^2$, such as at least about 40 embossments/cm$^2$, such as from 25 to about 80 embossments/cm$^2$. In certain embodiments the micro-embossments may consist of small protuberances on a given tissue ply and be formed by small protrusions on an embossing roll which press against and into the tissue ply to be embossed. The micro-embossments may be arranged in a pattern and may cover at least about 6 percent of the ply surface area, such as from about 6 to about 15 percent of the ply surface area.

As used herein the term "dot embossment" means an embossment that exhibits an aspect ratio of about 1:1.25 or less, such as an aspect ratio from about 1.0 to about 1.25. Non-limiting examples of dot embossments are embossments having a circular, oval, square, or triangular cross-sectional shape.

As used herein the term "depth" generally refers to the distance between the upper most surface plane of a tissue ply and the bottom most surface plane of an embossment.

DETAILED DESCRIPTION

The present invention provides fibrous structures, particularly tissue products and more particularly embossed tissue products comprising two or more embossed fibrous plies. Preferably one of the plies comprises an embossing pattern comprising a motif consisting of curvilinear line elements, particularly open, curvilinear line elements and still more particularly first and second discrete, open, curvilinear line elements spaced apart from one another. The present inventors have discovered that motifs consisting of line elements, and more particularly open curvilinear line elements, are well suited for use in the present invention because they contain inflection points that connote femininity, softness and cleansing. Additionally, the use of curvilinear line elements, and first and second discrete, open, curvilinear line elements spaced apart from one another in particular, provide for gradual transitions in contour within a pattern that may be soothing to a consumer and more easily balanced with other design elements. Further, the use of curvilinear line elements enables the formation of open elements that provide the resulting patterns with a sense of continuity and balance that is visually appealing.

The embossing patterns of the present invention are unlike those of the prior art, such as the pattern illustrated in FIG. 1, which have a motif 10, circumscribed by box ABCD, consisting at least in-part of a closed design element 20. The closed design element 20 is formed from a curvilinear line element 24, in this case a series of dot embossments 26 that provide the appearance of a continuous line element. The closed design element 20 is surrounded by a plurality of discrete curvilinear line elements 28*a*-28*d* that while forming an open element are arranged so as to have a closed appearance, particularly when viewed in conjunction with the closed design element 20. The resulting overall impression of the design does not connote femininity, softness and cleansing.

The present invention overcomes the limitation of prior art embossing patterns by providing a pattern having motifs comprising first, second and third discrete, open, curvilinear line elements. The resulting pattern not only connotes femininity, softness and cleansing while providing for gradual transitions in contour within the pattern, but also produces a product with good pattern clarity, a low degree of wrinkles and favor sheet properties such as high bulk.

To achieve the benefits of the present invention, it is generally desirable that at least two of the design elements within the pattern comprise discrete, open, curvilinear line elements. Further, it may be desirable that the two design elements be substantially similar in terms of shape and size and that they be spaced apart from one another equally along their entire length. For example, with reference to FIG. 2, the pattern 30 comprises a first motif 32, circumscribed by box ABCD consisting first, second and third line elements 33, 35, 37. Each of the first, second and third line elements 33, 35, 37 are curvilinear and form design elements that are discrete and open. Further, each of the first, second and third line elements 33, 35, 37 are spaced apart from one another and do not intersect one another.

The first line element 33 is formed from a substantially solid line, while the second and third elements 35, 37 are formed from a plurality of dot embossments 39 that have the visual appearance of being connected to a form a continuous line element. While the lines are illustrated as being formed from solid lines and dots the invention is not so limited and one skilled in the art will appreciate that several combinations of solid and broken lines may be used to form the design elements according to the present invention. Not only are the first, second and third line elements 33, 35, 37 all formed from line elements, they are visually related to one another by the fact that each element has an arc-like, or semi-circular, appearance.

With continued reference to FIG. 2, the second and third line elements 35, 37 are substantially similarly shaped and equally spaced apart from one another along the entire length of the element a distance (D). In particularly preferred embodiments the spacing between the second and third line elements 35, 37 is 1.00 mm or less, such as from 0.85 to about 1.00 mm, such as from 0.90 to 1.00 mm.

Figure 3:
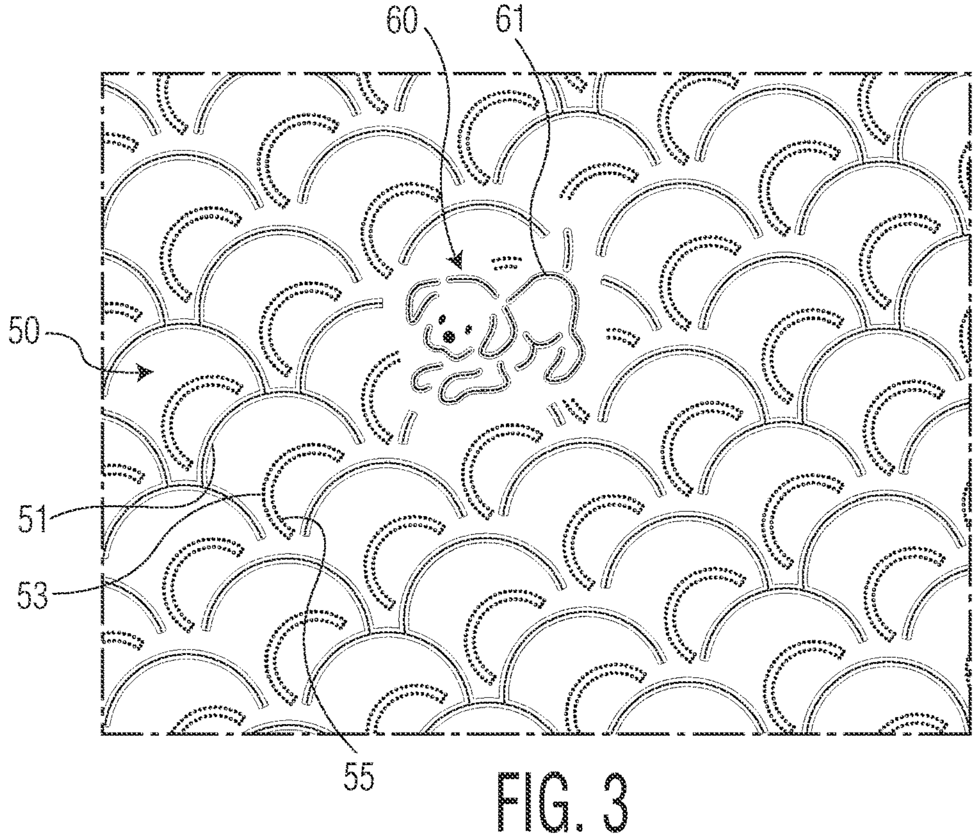
FIG. 3 illustrates an embossing pattern according to another embodiment of the present invention.
Figure 4:
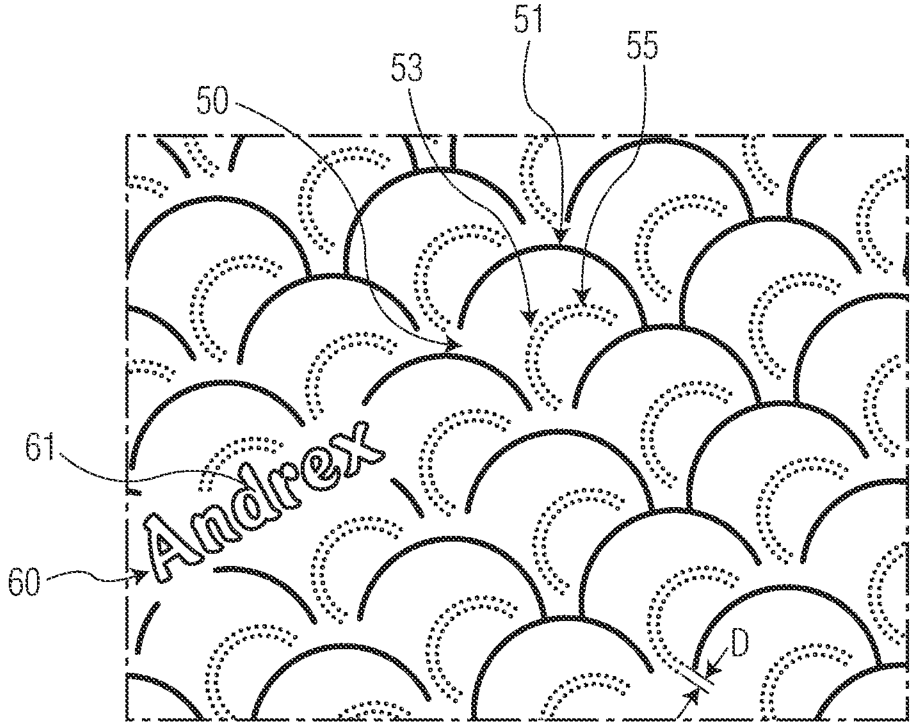
FIG. 4 illustrates an embossing pattern according to still another embodiment of the present invention

In certain preferred embodiments, the embossed tissue products of the present invention have an embossed background pattern formed substantially from open elements, such as the patterns illustrated in FIGS. 2-4. When forming embossed tissue products with background patterns according to the present invention, such as those illustrated in FIGS. 2-4, it has been discovered that certain elements must be properly spaced apart from one another to provide the proper tension in the sheet as it is embossed and prevent the formation of wrinkles. In particular, it has been discovered that when the pattern comprises pairs of similarly shaped and sized discrete elements the elements are preferably equally spaced apart from one another along their entire length and the distance between them is 1.00 mm or less, such as from 0.85 to about 1.00 mm, such as from 0.90 to 1.00 mm.

In particularly preferred embodiments, the present inventors have further discovered that the open design elements may be disposed on a first web that may be plied together with a second web comprising micro-embossments to create a multi-ply tissue product having improved properties, such as sheet bulk. Surprisingly, the micro-embossments on the second ply do not have to be disposed in registration with the design elements on the first ply to achieve the improved properties. That is the embossing pattern disposed on the first, uppermost ply, does not have to match or be phased relative to, the embossing pattern disposed on the second, bottommost ply.

Accordingly, in certain preferred embodiments, the invention provides a tissue product comprising a first, uppermost, ply having an open embossing pattern disposed thereon and a second, bottommost, ply comprising a plurality of micro-embossments, wherein the micro-embossments are not registered with the open embossing pattern of the uppermost ply. In a particularly preferred embodiment, the micro-embossments are disposed on the bottommost ply at a density of 25 embossments/$cm^2$ or more, such as at least about 30 embossments/$cm^2$, such as at least about 40 embossments/$cm^2$, such as from 25 to about 80 embossments/$cm^2$. Regardless of the density, the micro-embossments are disposed on the bottommost ply in a pattern that does not register with the embossing pattern disposed on the uppermost ply.

A wide breadth of design elements may be selected from when developing open patterns useful in the present invention. Particularly preferred design elements are those having a curvilinear shape and more particularly curvilinear line elements, such as line elements having an arc-like, or semi-circular, shape. Although open patterns useful in the present invention are preferably formed from curvilinear design elements, one skilled in the art will appreciate that a pattern may include shapes that are not curvilinear.

Several non-limiting curvilinear design elements useful in the present invention are illustrated in the attached figures. For example, FIG. 2 illustrates an embossing pattern 30 comprising a first motif 32, circumscribed by box ABCD, consisting of discrete, curvilinear line elements 33, 35, 37. In addition to the first motif 32, the embossing pattern 30 may further comprise a second motif 34 circumscribed by box EFGH, consisting of a semi-continuous and curvilinear first line elements 36 and discrete second and third curvilinear line elements 38, 40. The first, second and third curvilinear line elements 36, 38, 40 may be similarly shaped, such as semi-circles, and spaced apart from one another such that the elements do not intersect.

In other embodiments, such as that illustrated in FIG. 3 the embossing pattern may comprise a first and second pattern 50, 60 where the first pattern 50 forms the background pattern and comprises first, second and third curvilinear elements 51, 53, 55, all of which are open. The second pattern 60, which forms the foreground and makes up less of the total embossed area, compared to the background pattern, comprises a closed, discrete element 61. In the illustrated embodiment, the first pattern forms the background and is the more dominate pattern, in terms of embossed area, and provides the embossed tissue product with an overall appearance that is well balanced and connotes femininity, softness and cleansing.

In certain instances, the percentage of the tissue product surface area embossed with a background pattern may range from about 4 to about 12 percent, such as from about 5 to about 10 percent. In other instances, the percentage of the tissue product surface area embossed with a foreground pattern may be about 2 percent or less, such as about 1.5 percent or less, such as about 1.0 percent or less, such as from about 0.5 to about 2 percent.

In yet other embodiments, such as that illustrated in FIG. 4, the embossing pattern may comprise a first and second pattern 50, 60 where the first pattern 50 forms the background pattern and comprises first, second and third curvilinear elements 51, 53, 55, all of which are open. In the illustrated embodiment the background pattern is substantially free from closed design elements. Each of the line elements 51, 53, 55 forming the background pattern form open elements. Unlike the background pattern the foreground pattern, the second pattern 60, comprises a closed, discrete element 61. In the illustrated embodiment the first curvilinear elements 51, which are formed from solid lines, comprise about 4 percent of the total surface area of the tissue product. The second and third curvilinear elements 53, 55, which are formed from dot embossments and are visually connected to form a curvilinear line element, comprise about 2 percent of the total surface area. Together the first, second and third curvilinear elements 51, 53, 55 provide a background pattern that provides the embossed tissue product with an overall appearance that is well balanced and connotes femininity, softness and cleansing.

Figure 5:
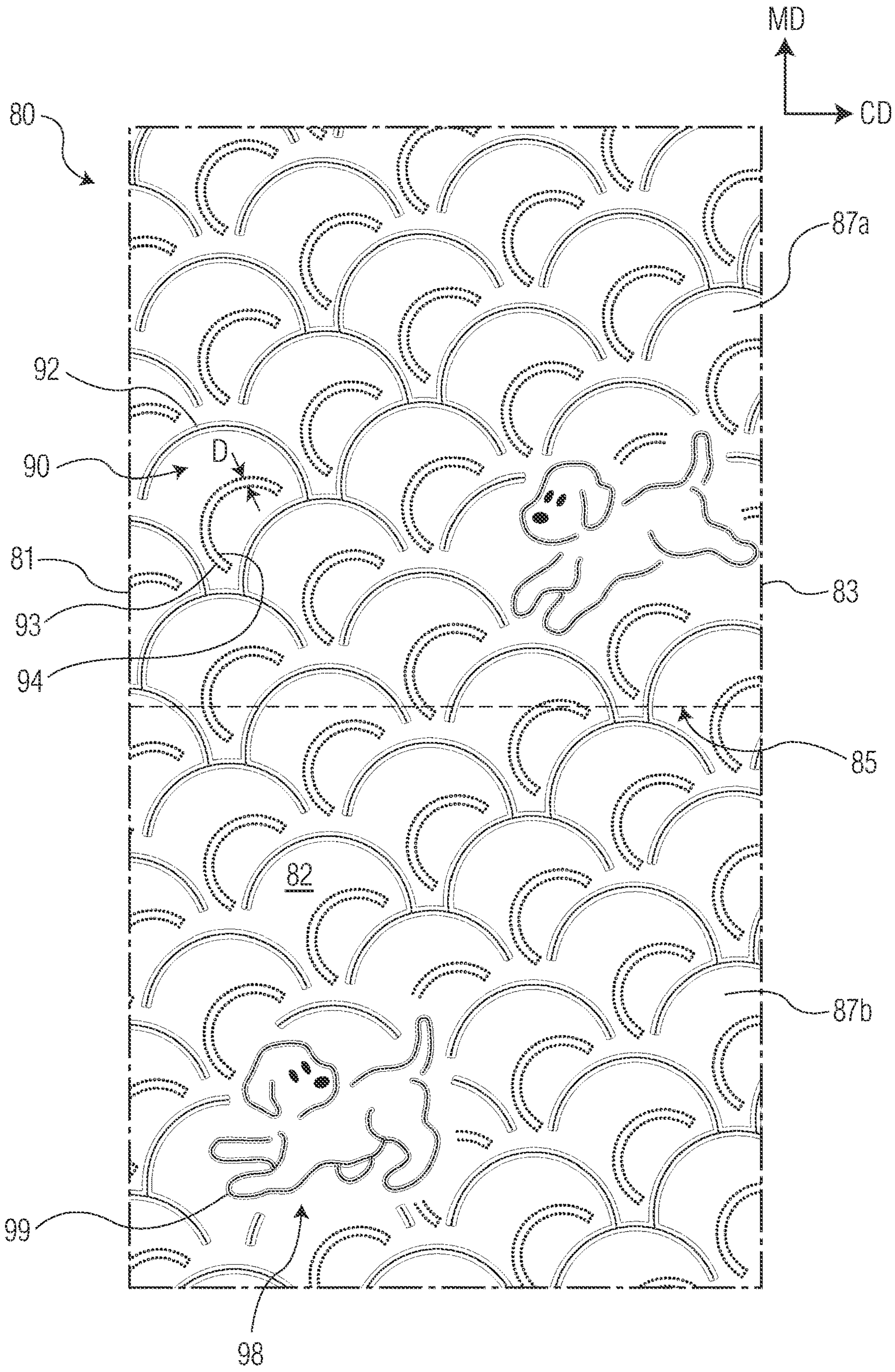
FIG. 5 is top plan view of an embossed tissue product.

With reference now to FIG. 5, one embodiment of an embossed tissue product 80 according to the present invention is illustrated. The embossed tissue product 80 generally comprises opposed lateral edges 81, 83 and horizontal lines of perforations 85 separating the product into individual sheets 87*a*, 87*b*. The tissue product has two principle axes of orientation—the machine direction (MD) and the cross-machine direction (CD). The upper surface 82 of the tissue product 80 is illustrated and comprises a first pattern 90, also referred to as a background pattern, and a second pattern 98, also referred to as a foreground pattern. The first pattern comprises first, second and third open curvilinear line elements 92, 93, 94. The second and third curvilinear line elements 93, 94 are discrete and are similarly shaped, such as semi-circles, and spaced apart from one another a distance (D) such that the elements do not intersect.

While it is generally preferred that the background pattern consist essentially of open elements, such as first, second and third open curvilinear line elements 92, 93, 94 as illustrated in FIG. 5, the tissue product may comprise one or more closed embossed patterns. For example, as illustrated in FIG. 5, the tissue product 80 may comprise a second pattern 98 comprising a line element 99 shaped to form a closed design element in the form of a character representation. As illustrated in FIG. 5, the closed element 99 may be formed from discrete elements such as dots or dashes that, from a visual perspective, appear to be a continuous unbroken line. Thus, despite the breaks, a person is able to mentally complete the shape so as to perceive a broken line element as a continuous line element. In other embodiments the foreground pattern may be closed letter-shaped motifs or a trademark.

In certain embodiments it may be preferred that the background pattern be skewed slightly relative to the CD. For example, it is known in the art that if embossing patterns were aligned horizontally, the concentration of elements in one location could cause the embossing roll to wear in that area. Likewise, embossing rolls are often used in conjunction with backing surfaces, or the like, to create a nip. If patterns are aligned horizontally, there may be fluctuations in the concentration of embossing elements at the nip causing vibrations. To resolve these issues, manufacturers often skew their embossing patterns on the embossing roll.

Figure 6:
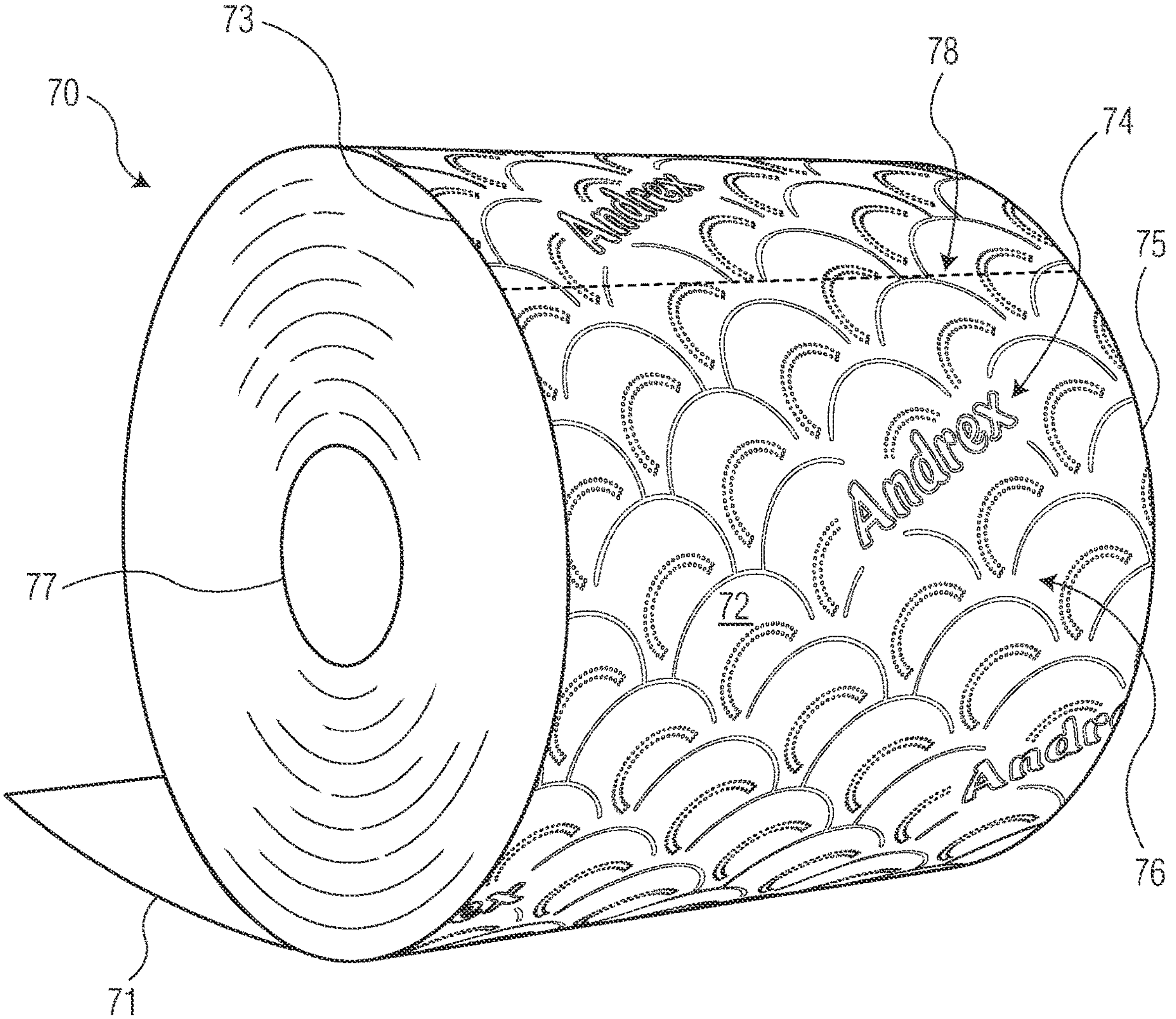
FIG. 6 is perspective view of a rolled tissue product.

With reference now to FIG. 6, in certain embodiments the tissue products of the present invention may be provided as a rolled tissue product 70 comprising a tissue sheet 71 spirally wound around a core 77 and having first and second edges 73, 75 and individual sheets separated by a line of perforations 78. The upper surface 72 bears first and second embossing patterns 74, 76. The first embossing pattern 74 forms the foreground pattern and comprises closed letter-shaped design elements. The second pattern 76 forms the background pattern and consists essentially of open elements, such as first, second and third open curvilinear line elements.

Figure 7:
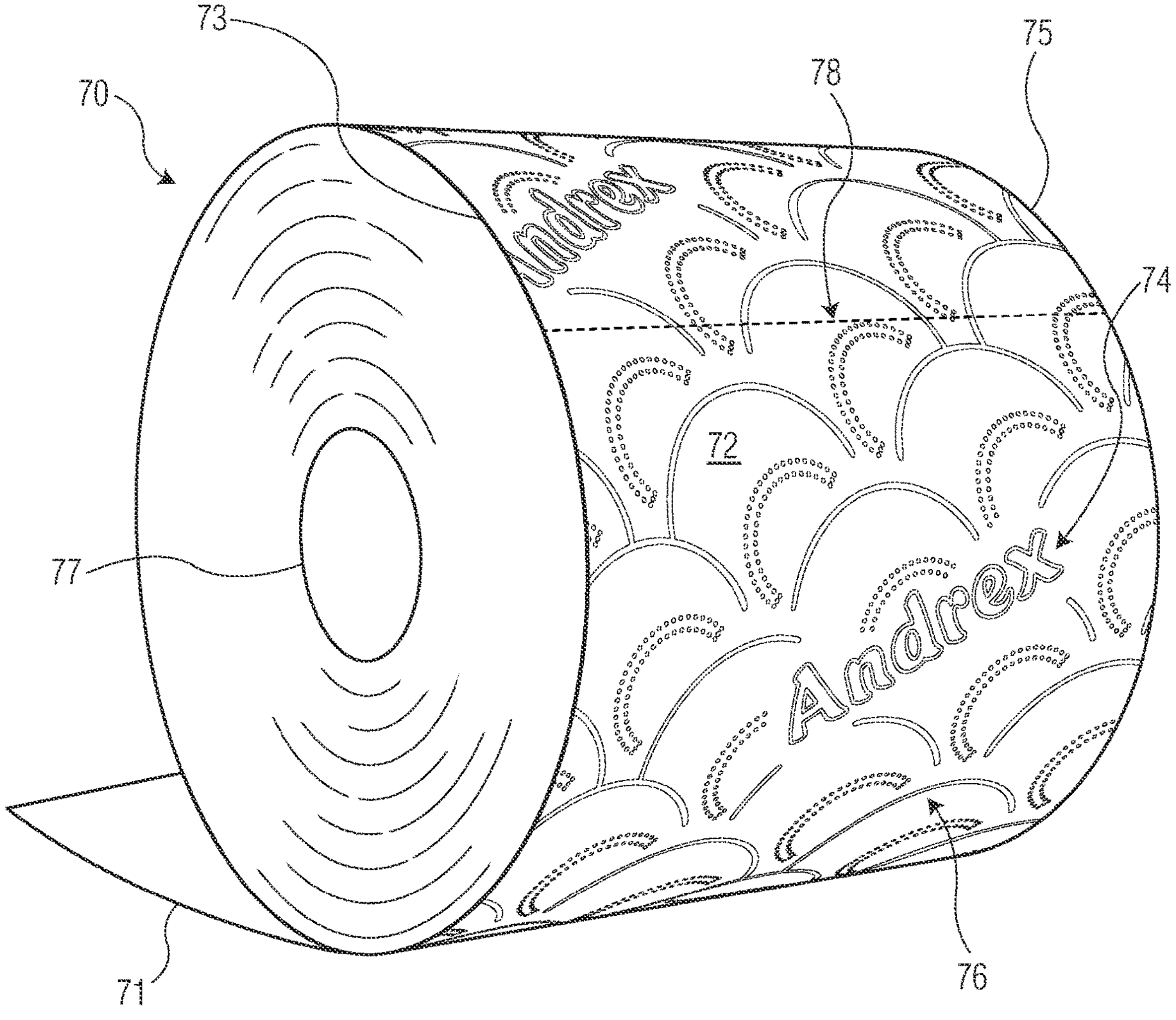
FIG. 7 is perspective view of a rolled tissue product.

Another embodiment of an embossed rolled tissue product 70 is illustrated in FIG. 7. In the illustrated embodiment, the rolled tissue product 70 comprises a tissue sheet 71 spirally wound around a core 77 and having first and second edges 73, 75 and individual sheets separated by a line of perforations 78. The upper surface 72 bears first and second embossing patterns 74, 76. The first embossing pattern 74 forms the foreground pattern and comprises closed letter-shaped design elements. The second pattern 76 forms the background pattern and consists essentially of open elements, such as first, second and third open curvilinear line elements.

In certain preferred embodiments the background pattern comprises first, second and third open curvilinear line elements where the second and third curvilinear line elements comprise a plurality of dot embossments that form a discrete line element. The second and third line elements have a similar size and shape and the line elements are equally spaced from one another along their lengths, such as less than 1.0 mm apart. Generally, it is preferred that each of the line elements forming the background pattern, such as first, second and third curvilinear line elements, do not converge towards one another, but rather remain spaced apart from one another and form open design elements. In this manner the background pattern is substantially free from closed design elements and provides the embossed tissue product with an appearance that is well balanced and connotes femininity, softness and cleansing.

While in certain embodiments it may be preferred that the background pattern comprise open curvilinear design elements, the product may comprise a second pattern comprising closed design elements such as circles and the like. While closed design elements may be incorporated into the inventive tissue products it is generally desirable that they only be incorporated to a lesser degree, such as an embossed area less than about 1 percent of the total tissue surface area so as not to overwhelm or distract from the background pattern.

Further, provided that consumers prefer patterns comprising curvilinear design elements it may be preferable to form the background patterned tissue products without the use of rectilinear elements. Rectilinear elements may be perceived as being sharp, dangerous and rough and as such may be avoided when forming patterns for use in tissue products according to the present invention. Thus, in certain embodiments, the embossed tissue product comprises an embossed background pattern that does not contain rectilinear elements. For example, the embossed background pattern may consist essentially of curvilinear design elements.

The tissue products of the present invention generally comprise two, three or four tissue plies made by well-known wet-laid papermaking processes such as, for example, creped wet pressed, modified wet pressed, creped through-air dried (CTAD) or uncreped through-air dried (UCTAD). For example, creped tissue webs may be formed using either a wet pressed or a modified wet pressed process such as those disclosed in U.S. Pat. Nos. 3,953,638, 5,324,575 and 6,080,279, the disclosures of which are incorporated herein in a manner consistent with the instant application. In these processes the embryonic tissue web is transferred to a Yankee dryer, which completes the drying process, and then creped from the Yankee surface using a doctor blade or other suitable device.

In other instances, the tissue plies may be manufactured by a through-air dried process known in the art. In such processes the embryonic web is noncompressively dried. For example, textured tissue plies may be formed by either creped or uncreped through-air dried processes. Particularly preferred are uncreped through-air dried webs, such as those described in U.S. Pat. No. 5,779,860, the contents of which are incorporated herein in a manner consistent with the present disclosure.

In still other instances the tissue plies may be manufactured by a process including the step of using pressure, vacuum, or air flow through the wet web (or a combination of these) to conform the wet web into a shaped fabric and subsequently drying the shaped sheet using a Yankee dryer, or series of steam heated dryers, or some other means, including but not limited to tissue made using the ATMOS process developed by Voith or the NTT process developed by Metso; or fabric creped tissue, made using a process including the step of transferring the wet web from a carrying surface (belt, fabric, felt, or roll) moving at one speed to a fabric moving at a slower speed (at least 5 percent slower) and subsequently drying the sheet. Those skilled in the art will recognize that these processes are not mutually exclusive, e.g., an uncreped TAD process may include a fabric crepe step in the process.

The instant multi-ply tissue product may be constructed from two or more plies that are manufactured using the same or different tissue making techniques. In a particularly preferred embodiment, the multi-ply tissue product comprises two or three plies wherein at least one of the plies is a through-air dried ply.

The multi-ply embossed tissue products of the present invention generally have a total product basis weight of at least about 20 gsm, such as at least about 30 gsm, such as at least about 40 gsm, such as from about 20 to about 70 gsm, such as from about 30 to about 65 gsm, such as from about 40 to about 60 gsm. In certain instances, the multi-ply embossed tissue products may comprise two, three or four tissue plies where the basis weight of each individual tissue ply is less than about 25 gsm, such as from about 10 to about 20 gsm, such as from about 10 to about 15 gsm.

The multi-ply embossed tissue products of the present invention generally have a geometric mean tensile (GMT) of about 800 g/3" or greater, such as about 900 g/3" or greater, such as about 1,000 g/3" or greater, such as from about 800 to about 1,700 g/3", such as from about 1,000 to about 1,500 g/3". In certain instances, the multi-ply embossed tissue products may comprise two, three, or four tissue plies where the GMT of each individual tissue plie is less than about 600 g/3", such as from about 200 to about 425 g/3", such as from about 350 to about 550 g/3".

In other instances, the multi-ply embossed tissue products of the present invention may have a sheet bulk greater than about 6.0 cc/g, such as from about 6.0 to about 14.0 cc/g. In certain instances, at the foregoing sheet bulks, the tissue products may have a sheet caliper greater than about 300

μm, such as greater than about 400 μm, such as greater than about 500 μm, such as greater than about 600 μm, such as from about 300 to about 1,000 μm.

The foregoing multi-ply tissue products may be converted into rolled tissue products, such as rolled bath tissue products, comprising a multi-ply embossed tissue web spirally wound about a core. Such rolled tissue products may comprise a plurality of connected, but perforated, multi-ply tissue sheets that may be separated from adjacent sheets.

To produce multi-ply tissue products, multiple base tissue sheets are prepared and then combined using well known processing machines (converting machines) which include operations such as unwinding the base tissue sheets, calendering, printing, embossing, bonding of individual plies to be combined together as well as cutting, perforation and folding. It is particularly preferred that one or more base sheets are embossed during formation of the product. An embossing process is carried out in the nip between an embossing roll, also referred to herein as a patterned roll, and an anvil roll, also referred to herein as a counter roll. The embossing roll can have protrusions on its circumferential surface leading to embossments in the paper web.

In certain embodiments the tissue products of the present invention may be manufactured from two or more base sheet webs, such as two, three or four base sheet webs that are combined together and embossed using an embossing technique commonly referred to as DERL (Double Embossing Random Lamination). In the DERL process, a first web is directed through the nip between an embossing roll and an anvil roll. In this nip the web is provided with an embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions at which the adhesive was applied.

The process further comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll.

The arrangement of the additional pair of rolls is placed close to the first pair of rolls and the marrying roll is not critical here, as the present invention generally does not require that the embossing elements of the first embossing roll and the embossing elements of the second embossing roll be arranged such that the embossed elements of the first embossed ply and the embossed elements of the second embossed ply fit into each other similar to a gearing system. In this manner, the embossing patterns disposed on the upper and bottom plies do not necessarily correlate or register with one another.

Figure 8:
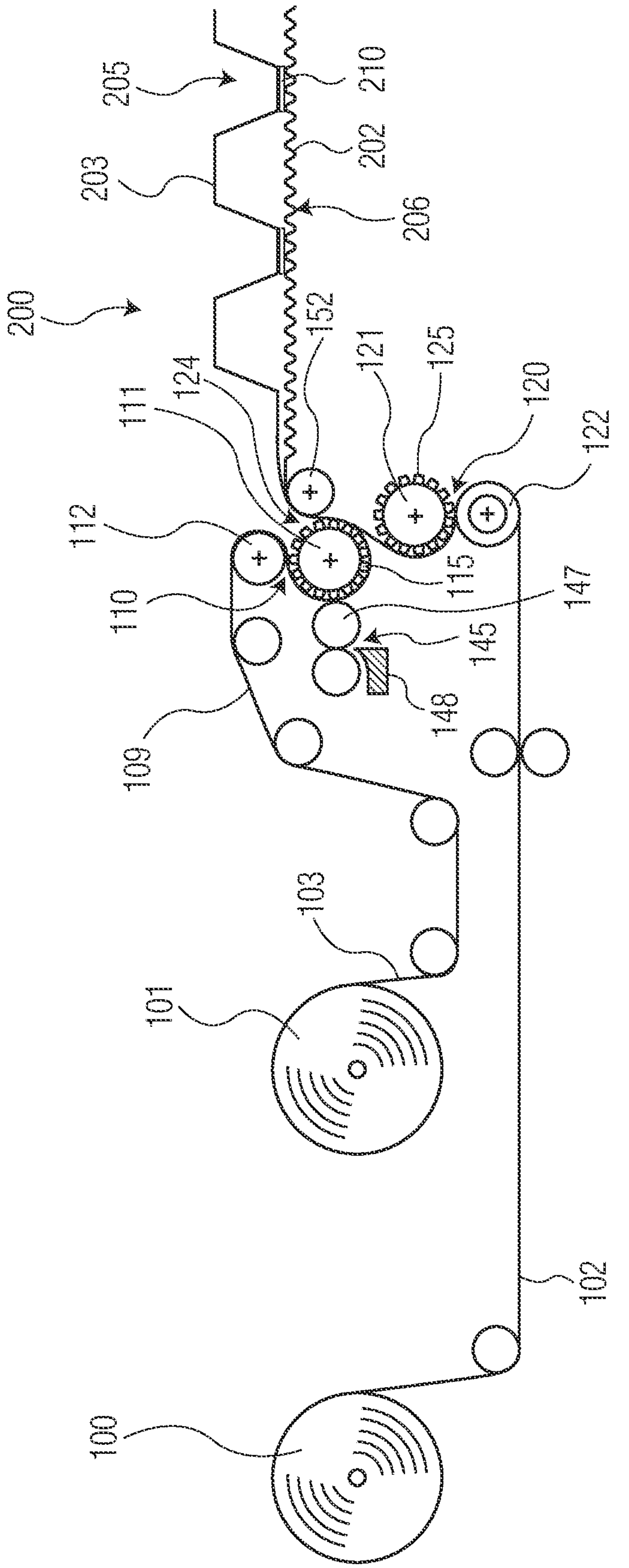
FIG. 8 is a schematic of a process useful in the manufacture of an embossed tissue product according to the present invention.

Turning now to FIG. 8, illustrated is one process for forming a two-ply tissue product 200 comprising an embossed bottommost ply 202 and an embossed uppermost ply 203 according to the present invention. Generally, the process begins by unwinding first and second parent rolls 100, 101 comprising first and second tissue webs 102, 103 which will ultimately form the first and second tissue plies 202, 203. In certain instances, one or more of the webs may be optionally pre-embossed in a first pre-embossing station or be subjected to other converting steps, such as calendering or slitting prior to being embossed and plied into a multi-ply product.

The embossing operation of the present invention utilizes an embossing roll and an anvil that create a nip pressure, when engaged with one another to form an embossing nip, sufficient to create deformations (embossments) in a fibrous structure present within the embossing nip. The embossing roll generally comprises a plurality of protrusions on its outer surface where the protrusions form an embossing pattern. For example, as illustrated in FIG. 8, a first tissue web 103 is directed into the first nip 110 of a first embossing station that includes a first embossing roll 111 and an anvil roll 112. In the nip between the first embossing roll 111 and anvil roll 112 the first ply 103 receives a first embossing pattern by being brought into contact with first protuberances 115 disposed on the surface of the first embossing roll 111.

In particular embodiments, the embossing roll is made of metal, especially steel, hard plastics materials or hard rubber. In case of plastics, very hard plastic material can be preferred, alternatively a resin material is also possible. In particular embodiments, the anvil roll is made of rubber like EPDM or NBR (acrylonitrile-butadiene rubber), paper or steel. The rubber can have a hardness between 20 and 85 Shore A, preferably between 50 and 75 Shore A.

The embossing roll may be made by any suitable process known in the art. Non-limiting examples of suitable processes include laser engraving hard plastic (ebonite) or ceramic or other material suitable for laser ablation to remove material and create embossing elements, chemical engraving of steel or other materials to remove material and create embossing elements, machining aluminum or steel or other metals to remove material and create embossing elements, metallizing processes to build up embossing elements, sintering processes to build up embossing elements and/or other means known in the art to remove material or build up material and achieve a surface topography with the desired pattern and clearances between mating embossing elements.

A second tissue web 102 is unwound from a second parent roll 100 and introduced into the nip 120 formed between a second embossing roll 121 and a second anvil roll 122 which form a second embossing station. As regards the possible materials for the second embossing roll 121 and a second anvil roll 122, the same materials as described above with reference to the first embossing roll 111 and the first anvil roll 112 also apply. Upon passing through the embossing nip 120 the second tissue web 102 is provided with a second embossing pattern, which is preferably different than the pattern applied by the first embossing station. The embossing pattern is imparted to the second tissue web 102 by contacting it with a plurality of second protuberances 125 disposed on the second embossing roll 121.

The process may further comprise an application device 145, which may include an applicator roll 147 for applying functional substances 148 to the first tissue web 103 after it exits the first embossing nip 110. Such applicator devices are well known in the art and are commonly used for the application of adhesives or colored substances. For example, the process may comprise an applicator roll 147 which contacts the protrusions on the first tissue web 103 while supported by the first embossing roll 111.

In a particularly preferred embodiment, an adhesive is applied by the application device, which may comprise an adhesive applicator roll running against the first embossing roll. For laminating the single webs of material together, different types of adhesive can be used. Suitable adhesives are, inter alia, glue on the basis of starch or modified starch like, for example, methyl cellulose or carboxylated methyl cellulose, and adhesively acting polymers on the basis of synthetic resins, caoutchouc, polypropylene, polyisobutylene, polyurethane, polyacrylates, polyvinyl acetate or polyvinyl alcohol. Such adhesives can also contain coloring agents in order to improve the optical appearance of the finished products. Frequently, water-based glues are used for laminating together paper layers.

In certain embodiments, the embossing patterns applied to the first and second tissue webs respectfully do not need to be registered with one another to provide the finished tissue product with improved properties, such as improved sheet bulk. In this way, the first and second plies do not need to be combined to form a subunit—the bottom ply embossments nesting into a structure formed by the embossing pattern of the first ply. Rather than being nested, that is one embossing pattern at least partially surrounding another, the embossing patterns are unregistered. This simplifies the manufacturing process as there is no need to operate the first and second embossing rolls in registration or synchronized with one another.

The embossed first and second tissue webs are joined together by a marrying roll 152 that runs against the first embossing roll 111. In this manner the embossed first tissue web, which may have an adhesive applied to its surface by an applicator roll 147, is laminated to the second embossed tissue web in a third nip 124 formed between the first embossing roll 111 and the marrying roll 152.

The resulting multi-ply tissue product 200 comprises an uppermost ply 203 and a bottommost ply 202. The first upper ply 203 has a plurality of embossments 205 that protrude inward towards the bottommost ply 202. In certain instances, such as illustrated in FIG. 8, the uppermost ply 203 may be attached to the bottommost ply 202 by an adhesive 210 disposed therebetween.

Generally, at least a portion of the uppermost ply embossments are arranged to form an open pattern, as discussed above. The bottommost ply 202 also comprises a plurality of embossments 206, a portion of which are preferably micro-embossments. While both the uppermost and bottommost plies comprise embossments, particularly embossments arranged in a pattern, the embossments are not arranged such that the patterns are registered with one another.

Further, in certain embodiments, it may be preferred to provide the uppermost ply with a plurality of continuous, curvilinear line elements formed from embossments having a depth of about 300 μm or more, such as about 325 μm or more, such as about 350 μm or more, such as from about 300 μm to about 500 μm. Conversely, the bottommost ply, is provided with a plurality of micro-embossments, which in certain preferred instances are dot embossments disposed at a density of at least 25 embossments/cm$^2$. Generally, the micro-embossments are disposed on the bottommost ply in a pattern, however, the pattern does not necessarily register with the pattern of embossments disposed on the uppermost ply. Despite the lack of registration between the embossing patterns, the resulting tissue products have improved properties, such as improved sheet bulk and softness.

Test Methods

Basis Weight

Prior to testing, all samples are conditioned under TAPPI conditions (23±1° C. and 50±2 percent relative humidity) for a minimum of 4 hours. Basis weight of sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The basis weight pad is then weighed on a top loading balance with a minimum resolution of 0.01 grams. The top loading balance must be protected from air drafts and other disturbances using a draft shield. Weights are recorded when the readings on the top loading balance become constant. The mass of the sample (grams) per unit area (square meters) is calculated and reported as the basis weight, having units of grams per square meter (gsm).

Caliper

Caliper is measured in accordance with TAPPI Test Method T 580 pm-12 “Thickness (caliper) of towel, tissue, napkin and facial products.” The micrometer used for carrying out caliper measurements is an Emveco 200-A Tissue Caliper Tester (Emveco, Inc., Newberg, OR). The micrometer has a load of 2 kilo-Pascals, a pressure foot area of 2,500 square millimeters, a pressure foot diameter of 56.42 millimeters, a dwell time of 3 seconds and a lowering rate of 0.8 millimeters per second.

Tensile

Tensile testing is conducted on a tensile testing machine maintaining a constant rate of elongation and the width of each specimen tested is 3 inches. Testing is conducted under TAPPI conditions. More specifically, samples for dry tensile strength testing were prepared by conditioning under TAPPI conditions for at least 4 hours and then cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the “MD tensile strength” or the “CD tensile strength” of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of g·cm/cm$^2$ and slope is recorded in units of kilograms (kg). Both TEA and Slope are directionally dependent and thus MD and CD directions are measured independently.

All products were tested in their product forms without separating into individual plies. For example, a 2-ply product was tested as two plies and recorded as such. When the tensile properties of basesheets were measured, the number of plies used varied depending on the intended end use. For example, if the basesheet was intended to be used for 2-ply product, two plies of basesheet were combined and tested.

Embodiments

In a first embodiment the present invention provides embossed tissue product comprising a first ply and a second ply, the first ply having a plurality of embossments disposed thereon in a background embossing pattern consisting of first, second and third open, curvilinear line elements, wherein the second and third line elements are discrete, similarly shaped curvilinear line elements that are arranged parallel to one another and spaced apart about 1.0 mm or less.

In a second embodiment the present invention provides the product of the first embodiment wherein the second and third line elements are spaced apart from one another from about 0.80 to about 1.0 mm.

In a third embodiment the present invention provides the product of the first or the second embodiments wherein the background pattern is substantially free from closed line elements.

In a fourth embodiment the present invention provides the product of any one of the foregoing embodiments wherein the second and third line elements are at least partially formed by dot embossments.

In a fifth embodiment the present invention provides the product of any one of the foregoing embodiments wherein the tissue product has a sheet bulk from about 6.0 to about 14.0 cubic centimeters per gram (cc/g).

In a sixth embodiment the present invention provides the product of any one of the foregoing embodiments wherein the tissue product is spirally wound around a core to yield a rolled tissue product.

In a seventh embodiment the present invention provides the product of any one of the foregoing embodiments wherein the tissue product has a basis weight of about 65 gsm or less and a GMT less than about 1,700 g/3".

In an eighth embodiment the present invention provides the product of any one of the foregoing embodiments wherein the background pattern is at least partially formed by dot embossments having a depth from about 300 to about 500 μm.

In a ninth embodiment the present invention provides the product of any one of the foregoing embodiments wherein the background pattern is at least partially formed by dot embossments arranged to form an open, discrete and curvilinear line element.

In a tenth embodiment the present invention provides the product of any one of the foregoing embodiments wherein the background pattern is at least partially formed by an open, semi-continuous, curvilinear line element.

In an eleventh embodiment the present invention provides the product of any one of the foregoing embodiments wherein the background pattern has an embossed area ranging from about 3 to about 10 percent of the total surface area of the first tissue ply.

In a twelfth embodiment the present invention provides the product of any one of the foregoing embodiments wherein the background pattern does not comprise closed design elements.

In a thirteenth embodiment the present invention provides the product of any one of the foregoing embodiments wherein the first line element comprises a solid line element embossment and the second and third line elements consist essentially of a plurality of dot embossments.

In a fourteenth embodiment the present invention provides the product of any one of the foregoing embodiments wherein the first, second and third line elements have a semi-circular shape.

What is claimed is:

1. An embossed tissue product comprising a first ply and a second ply, the first ply having a plurality of embossments disposed thereon and a background embossing pattern consisting of first, second and third open, curvilinear line elements, wherein the second and third line elements are discrete, similarly shaped curvilinear line elements that are arranged parallel to one another such that the second and third line elements are spaced apart about 1.0 mm or less along the entire length of the second and third line elements.

2. The embossed tissue product of claim 1 wherein the second and third line elements are spaced apart from one another from about 0.80 to about 1.0 mm.

3. The embossed tissue product of claim 1 wherein the background pattern is substantially free from closed line elements.

4. The embossed tissue product of claim 1 wherein the second and third line elements are at least partially formed by dot embossments.

5. The embossed tissue product of claim 1 wherein the second and third line elements consist essentially of a plurality of dot embossments.

6. The embossed tissue product of claim 5 wherein the plurality of dot embossments have a depth from about 300 to about 500 μm.

7. The embossed tissue product of claim 1 wherein the first line element comprises a solid line element embossment.

8. The embossed tissue product of claim 1 wherein the first, second and third line elements have a semi-circular shape.

9. The embossed tissue product of claim 1 wherein the first, second and third line elements are spaced apart from one another and do not intersect.

10. The embossed tissue product of claim 1 wherein the tissue product consists of two plies and has a basis weight from about 35 to about 65 grams per square meter (gsm).

11. The embossed tissue product of claim 1 wherein the tissue product has a sheet bulk of about 6.0 cc/g or greater.

12. The embossed tissue product of claim 1 wherein first ply further comprises a foreground embossing pattern.

13. The embossed tissue product of claim 12 wherein the foreground embossing pattern comprises a closed design element.

14. The embossed tissue product of claim 12 wherein the embossments forming the background pattern cover greater than about 4 percent of the surface area of the first ply and the embossments forming the foreground pattern cover less than about 2 percent of the surface area of the first ply.

* * * * *